May 19, 1964 R. A. BEEBE 3,133,515
SEED DROPPING ATTACHMENT FOR PLANTING IMPLEMENTS
Filed Aug. 16, 1961 2 Sheets-Sheet 1

INVENTOR.
RAYMOND A. BEEBE
BY
Wolfe, Hubbard, Voit & Osann
ATTORNEYS.

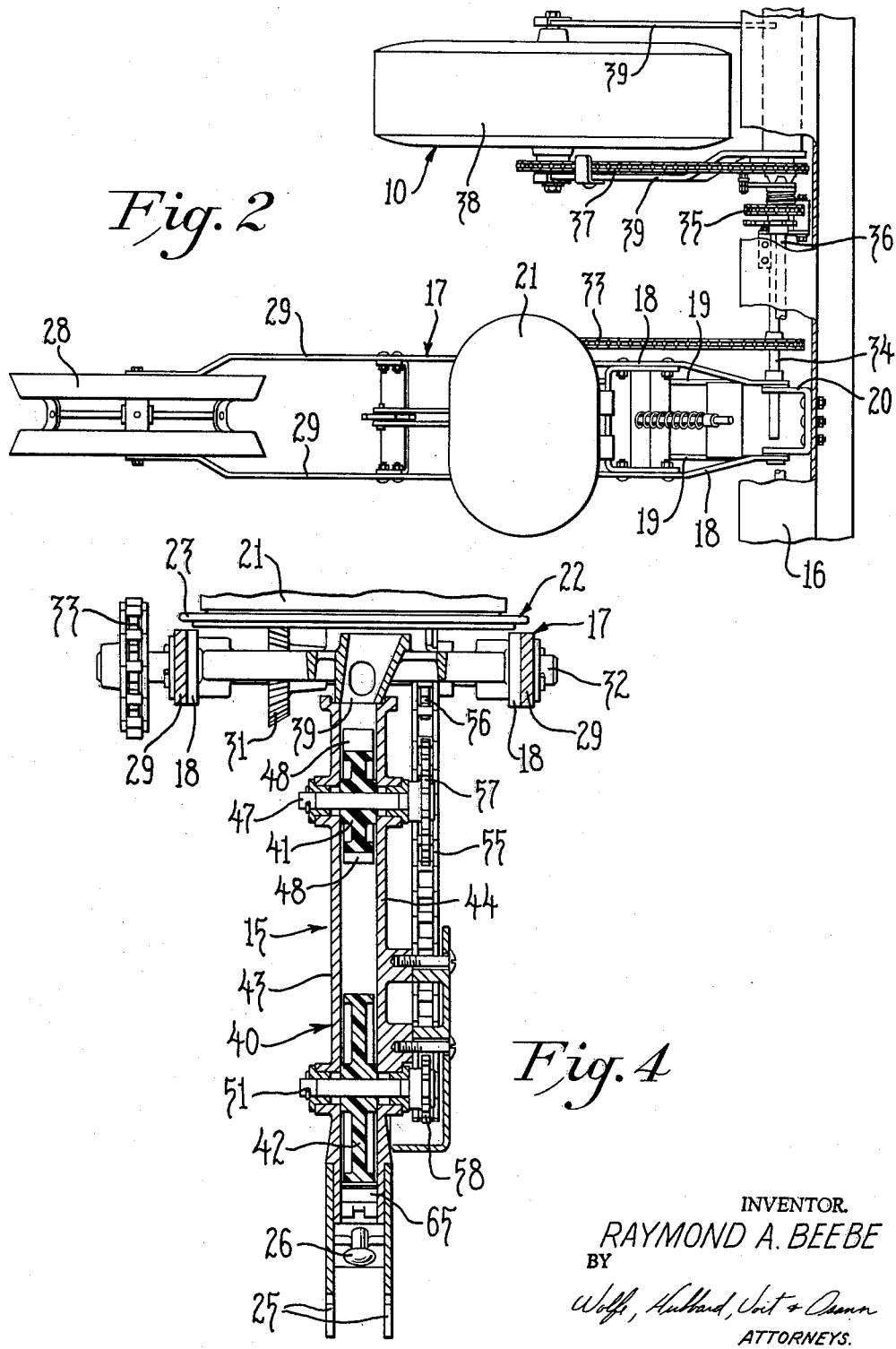

United States Patent Office 3,133,515
Patented May 19, 1964

3,133,515
SEED DROPPING ATTACHMENT FOR PLANTING IMPLEMENTS
Raymond A. Beebe, Detroit, Mich., assignor to Massey-Ferguson Inc., Detroit, Mich., a corporation of Maryland
Filed Aug. 16, 1961, Ser. No. 131,787
4 Claims. (Cl. 111—36)

This invention relates to agricultural planting implements and more particularly concerns a seed dropping attachment for a row crop planter.

A planter for a crop such as corn conventionally includes a seed dispensing mechanism which feeds the seed at a selected rate to a tube-like boot. The boot ends behind a furrow opener so that the seed falls into a furrow formed by the planter.

It is the primary aim of the invention to provide an attachment for a row crop planter which accurately feeds seed from the dispenser to the furrow opener even at very high operating speeds. In more detail, it is an object of the invention to provide a planter attachment as characterized above that maintains positive control of the seed, at all planting rates, from the dispensing operation to the planting operation. It is a collateral object to provide an attachment of this type which minimizes the effect of seed bounce or rebound.

Another object is to provide an attachment of the above type which precisely maintains the seed count and planting rate for which the dispensing mechanism of the planter is set, even under high speed operating conditions.

A further object is to provide an attachment as described above which positively discharges the selected number of seeds at exactly timed intervals.

Other objects and advantages of the invention will become apparent upon reading the following detailed description and upon reference to the drawings, in which:

FIG. 2 is a fragmentary plan of the implement shown in FIG. 1;

FIG. 4 is a section taken approximately along the line 4—4 in FIG. 3.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Figure 1:
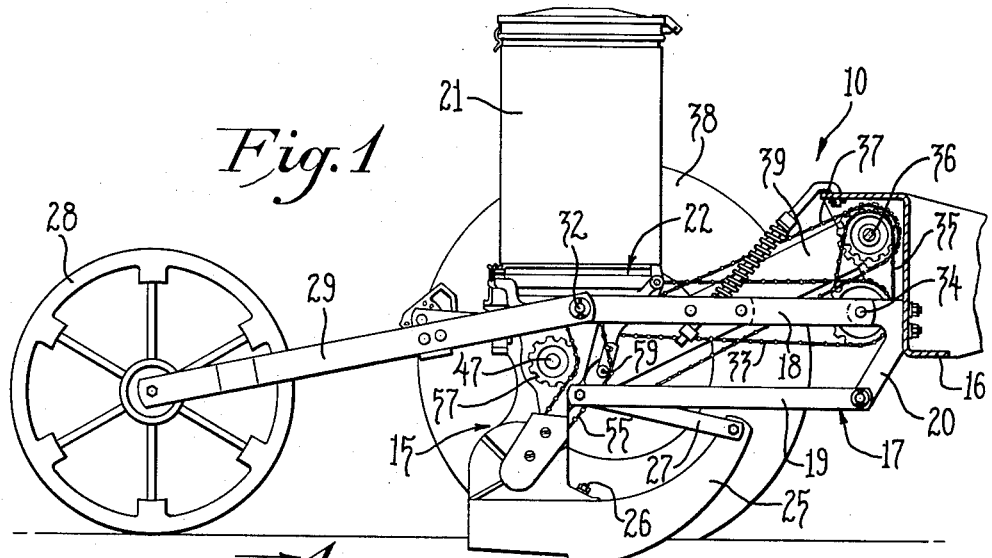
FIGURE 1 is an elevation, partially in section, of a planting implement embodying the invention.

Turning now to the drawings, there is shown in FIGS. 1 and 2 a portion of a planting implement 10 which embodies a seed dropping attachment 15 constructed in accordance with the invention. The implement 10 includes a hitch frame 16 on which is mounted a row unit 17 that comprises the attachment 15.

The row unit 17 includes parallel frame members 18 and 19 which are pivoted on a bracket 20 rigidly mounted on the hitch frame 16. The frame members 18, 19 support a seed hopper 21 that overlies a dispensing mechanism 22 adapted to meter seed from the hopper 21. The dispensing mechanism 22 of the illustrated implement 10 is of the type shown in U.S. Patent No. 2,685,988 and includes horizontal feed plates 23.

A furrow opener 25 of the curved runner type is secured to the attachment 15 by a bolt 26 and a brace 27. A covering device comprising a double press wheel 28 is secured by a pair of arms 29 behind the opener 25. As will be clear to those familiar with the art, the attachment 15 can be utilized with other types of furrow openers and covering devices without departing from the invention.

In the illustrated construction, the feed plates 23 of the dispensing mechanism 22 are driven by a bevel gear 31 (see FIG. 4) which is fixed to a planting unit cross shaft 32. The shaft 32 is coupled by a chain 33 to a drive shaft 34 journalled transversely on the hitch frame 16. The drive shaft 34 is powered by a chain 35 from a power shaft 36 which is driven by a chain 37 from a ground wheel 38. The ground wheel 38 is supported on arms 39 depending from the hitch frame 16. The drive arrangement is such that forward movement of the implement 10 rotates the ground wheel 38 and drives the dispensing mechanism 22 so as to meter seeds from the hopper 21 through an opening 39 (see FIG. 3). The sizes of the sprockets about which the chains 33, 35 and 37 are trained are selected so that seeds are metered through the opening 39 at a desired rate relative to the ground speed of the implement 10.

In accordance with the invention, the attachment 15 includes a boot or housing 40, extending from the dispensing mechanism 22 to a seed discharge point behind the furrow opener 25, which contains an accumulator wheel 41 and a discharge wheel 42 arranged and driven to positively control and properly discharge seeds as they drop from the dispensing mechanism. The housing 40 preferably takes the form of an integral, narrow casting having flat side walls 43 and 44 which are closely spaced by front and rear walls 45 and 46, respectively, so as to form a hollow structure open to the seed dispensing opening 39.

The accumulator wheel 41 is journalled transversely of the attachment 15 on a shaft 47 just below the dispensing mechanism 22 and is formed with a plurality of equally spaced teeth 48. In the illustrated case, five such teeth are provided. The side and rear walls of the housing 40, together with the periphery of the accumulator wheel 41, define an arcuate passage 50 which is blocked by the accumulator wheel teeth 48. The passage 50 lies just beneath the seed dispensing opening 39.

The discharge wheel 42 is journalled transversely of the attachment 15 on a shaft 51 positioned below the accumulator wheel 41. The discharge wheel 42 is formed with radially extending teeth 52 and, in the illustrated example, the wheel 42 carries two oppositely disposed teeth 52. The side and front walls of the housing 40, together with the periphery of the discharge wheel 42, define a chute 53 which is blocked by the teeth 52 and which ends in a discharge opening 54 that constitutes the seed discharge point positioned at the rear of the furrow opener 25.

The wheels 41, 42 are driven in synchronism with the dispensing mechanism 22 by a chain 55 which is trained about a sprocket 56, secured to the planting unit cross shaft 32, and a pair of sprockets 57, 58 keyed respectively to the wheel shafts 47, 51 and sized to maintain the speed relationship between the wheels 41, 42 discussed below. The chain 55 is held taut by an idler roller 59 secured to an exterior lug on the housing 40.

Figure 3:
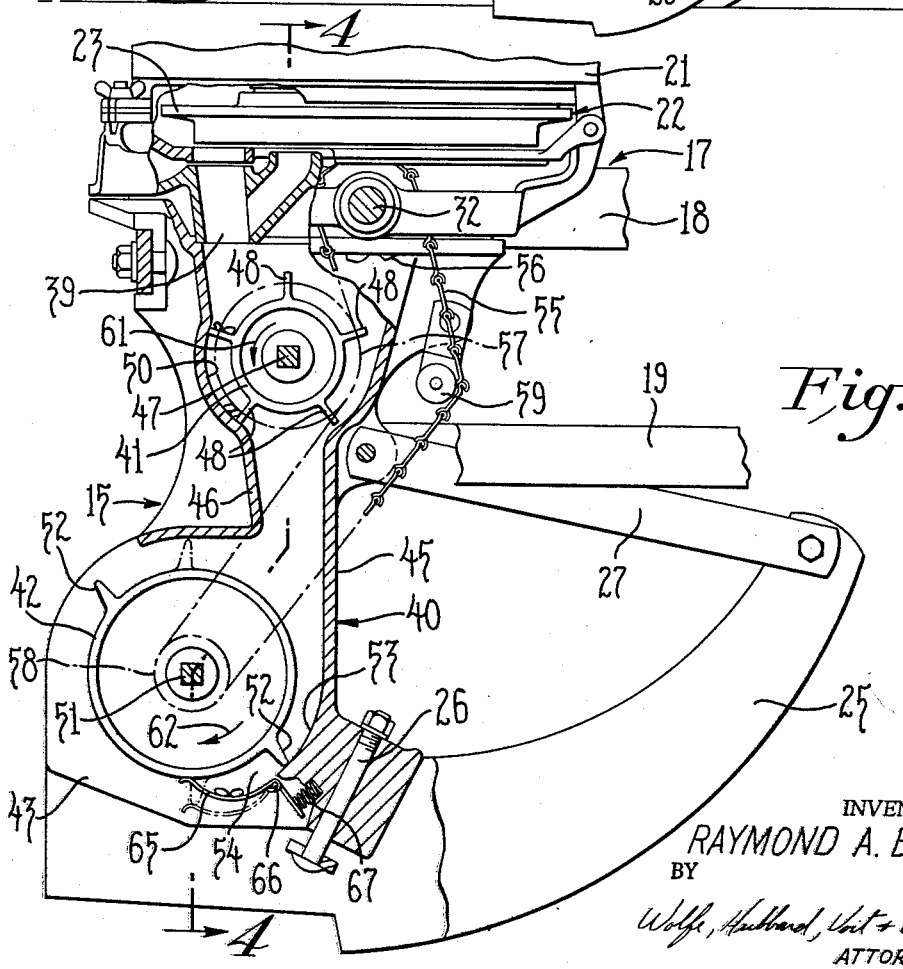
FIG. 3 is an enlarged section of a portion of the implement shown in FIG. 1.

The accumulator wheel 41 is driven in the direction of the arrow 61 seen in FIG. 3 so that the teeth 48 rotate downwardly through the passage 50 at a rate that traps a selected number of seeds in the passage 50 between adjacent ones of the teeth 48. Since both the dispensing mechanism 22 and the accumulator wheel 41 are driven from the cross shaft 32, the relative speeds at which the feed plates 23 and the accumulator wheel are driven remains fixed. In the illustrated embodiment, the speeds have been selected so that two seeds drop from the opening 39 onto each of the teeth 48 as the teeth rotate downwardly through the passage 50.

The discharge wheel 42 rotates in the direction of the arrow 62 so that the selected number of seeds, two in this case as explained above, when dropped from one of the accumulator wheel teeth 48 are swept through the chute 53 and out of the opening 54 by the discharge wheel teeth 52. Since, in the illustrated embodiment, the accumulator wheel 41 has five teeth 48 and the discharge wheel 42 has two teeth 52, it will be apparent that to maintain the above relationship the discharge wheel 42 is driven at a rate of rotation that is 2½ times the rotation rate of the accumulator wheel 41. Thus, each time that one of the accumulator wheel teeth 48 drops the selected number of seeds into the chute 53, one of the discharge wheel teeth 52 sweeps those seeds through the chute and out of the opening 54.

To insure accurately timed seed discharge, the opening 54 is normally closed by a valve or closure member 65 that is pivoted on the housing at 66 and biased by a spring 67 toward the periphery of the discharge wheel 52. With the closure member 65 bearing on the periphery of the discharge wheel 42, the solid line position shown in FIG. 3, the opening 54 is completely closed and seeds dropping through the chute 53 rest on the closure member. As the discharge wheel teeth 52 sweep through the chute 53 they engage the closure member 65 and swing the closure member to the dashed line position shown in FIG. 3 against the force of the biasing spring 67 and, in so doing, sweep the seeds in the chute through the opening 54 and from the planter.

The various features and advantages of the attachment 15 can now be appreciated. It will be noted that the accumulator wheel 41 has been provided with a greater number of teeth and is of a smaller diameter than the discharge wheel 42. Thus, the accumulator wheel 41 rotates relatively slowly and, in addition, is positioned quite close to the seed dispensing opening 39. As a result, the seeds drop only a short distance onto the teeth 48 from the dispensing mechanism 22 so that there is little seed bounce or rebound. Also, the relatively slowly moving teeth 48 allow a fully adequate time for the desired number of seeds to settle on each tooth before the succeeding tooth moves into the passage 50 and traps the selected seed group between adjacent teeth. The accumulator wheel 41 thus positively collects the desired seed group and the size of this group can, of course, be easily varied by changing the relative drive rates of the accumulator wheel 41 and the dispensing mechanism 22; a relatively simple task involving only the selection of suitably sized chain sprockets.

It will also be appreciated that the seeds of the group trapped between adjacent ones of the teeth 48 are dropped simultaneously as the teeth 48 rotate out of the chute 53 so that the entire seed group is dropped, under control, from the accumulator wheel 41 into the chute 53.

The discharge wheel 42 has relatively few teeth and is of a larger diameter as compared to the accumulator wheel 41 and hence is rotated at a relative high speed to maintain the inventive relationship. The relatively high peripheral speed of the discharge wheel 42 tends to minimize seed rebound or bounce by sharply urging the seeds striking the periphery of the wheel down into the chute 53. The wide spacing of the discharge wheel teeth 52 insures that the entire seed group properly settles in the chute 53 before the succeeding tooth sweeps through the chute to discharge the seeds from the planter. The closure member 65, which opens only upon passage of one of the teeth 52, insures discharge of the seeds at precisely timed intervals.

Because the dropping seeds are at all times under control, it has been found that the attachment 15 continues to function efficiently and reliably at relatively high planting speeds so that the implement 10, embodying the attachment 15, can be driven quite rapidly without sacrificing planting accuracy.

I claim as my invention:

1. In a planter having a seed dispensing mechanism positioned above a furrow opener, the combination comprising, a hollow housing extending from the dispensing mechanism to a discharge point behind the furrow opener, an accumulator wheel journalled in said housing below said mechanism and having equally spaced peripheral teeth, said housing and the periphery of said accumulator wheel defining a seed passage which is always blocked by successive ones of said teeth, means coupling said accumulator wheel for rotation in synchronism with said dispensing mechanism so that said teeth rotate downwardly through said passage with a selected number of seeds from said mechanism being trapped between adjacent teeth, a discharge wheel journalled in said housing below said accumulator wheel and having a radially extending tooth, said housing and the periphery of said discharge wheel defining a chute which is periodically blocked by said tooth, said chute ending in a discharge opening at said discharge point, means coupling said discharge wheel for rotation in synchronism with said accumulator wheel so that said selected number of seeds when dropped from one of said accumulator wheel teeth are swept through said chute and out of said opening by said discharge wheel tooth.

2. In a planter having a seed dispensing mechanism positioned above a furrow opener, the combination comprising, a hollow housing extending from the dispensing mechanism to a discharge point behind the furrow opener, an accumulator wheel journalled in said housing below said mechanism and having equally spaced peripheral teeth, said housing and the periphery of said accumulator wheel defining a seed passage which is always blocked by successive ones of said teeth, means coupling said accumulator wheel for rotation in synchronism with said dispensing mechanism so that said teeth rotate downwardly through said passage with a selected number of seeds from said mechanism being trapped between adjacent teeth, a discharge wheel journalled in said housing below said accumulator wheel and having a radially extending tooth, said housing and the periphery of said discharge wheel defining a chute which is periodically blocked by said tooth, means coupling said discharge wheel for rotation in synchronism with said accumulator wheel so that said selected number of seeds when dropped from one of said accumulator wheel teeth are swept through said chute, a closure member movably mounted on said housing and biased toward the periphery of said discharge wheel to close said opening, said tooth being effective to swing said member from the discharge wheel as the tooth rotates past the member so as to discharge seeds from the chute.

3. In a planter having a seed dispensing mechanism, the combination comprising, an accumulator wheel journalled below said mechanism and having a plurality of equally spaced peripheral teeth, means including the periphery of said accumulator wheel defining a passage which is blocked by said teeth, means driving said accumulator wheel in synchronism with said dispensing mechanism so that said teeth rotate downwardly through said passage with a selected number of seeds from said mechanism being trapped between adjacent teeth, a discharge wheel journalled transversely below said accumulator wheel and having a radially extending tooth, means including the periphery of said discharge wheel defining a chute which is blocked by said tooth, said chute ending in a discharge opening, means coupling said discharge wheel for rotation in synchronism with said accumulator wheel so that said selected number of seeds when dropped from one of said accumulator wheel teeth are swept through said chute and out of said opening by said discharge wheel tooth, said discharge wheel having a greater diameter and fewer teeth than said accumulator wheel, whereby the discharge wheel rotates relatively rapidly to minimize seed rebound and the accumulator wheel rotates relatively slowly so as to reliably collect the desired number of seeds between adjacent teeth.

4. In a planter having a seed dispensing mechanism positioned above a furrow opener, the combination comprising, a narrow, flat sided hollow housing disposed longitudinally between the dispensing mechanism and a discharge point behind the furrow opener, an accumulator wheel journalled transversely within said housing below said mechanism and having a plurality of equally spaced peripheral teeth, said housing and the periphery of said accumulator wheel defining a passage which is blocked by said teeth, means driving said accumulator wheel in synchronism with said dispensing mechanism so that said teeth rotate downwardly through said passage with a selected number of seeds from said mechanism being trapped between adjacent teeth, a discharge wheel journalled transversely within said housing below said accumulator wheel and having a radially extending tooth, said housing and the periphery of said discharge wheel defining a chute which is blocked by said tooth, said chute ending in a discharge opening at said discharge point, means coupling said discharge wheel for rotation in synchronism with said accumulator wheel so that said selected number of seeds when dropped from one of said accumulator wheel teeth are swept through said chute and out of said opening by said discharge wheel tooth, said discharge wheel having a greater diameter and fewer teeth than said accumulator wheel, whereby the discharge wheel rotates relatively rapidly to minimize seed rebound and the accumulator wheel rotates relatively slowly so as to reliably collect the desired number of seeds between adjacent teeth.

References Cited in the file of this patent

UNITED STATES PATENTS

| | | |
|---|---|---|
| 203,325 | Davies | May 7, 1878 |
| 951,818 | Johnson | Mar. 15, 1910 |
| 968,765 | Hamer | Aug. 30, 1910 |
| 1,269,591 | Fischer | June 18, 1918 |
| 1,751,486 | Lutz | Mar. 25, 1930 |
| 2,085,354 | Erickson | June 29, 1937 |
| 2,252,374 | Hipple | Aug. 12, 1941 |
| 2,269,798 | Traphagen | Jan. 13, 1942 |
| 2,379,724 | Lanham | July 3, 1945 |
| 2,854,933 | Kuester | Oct. 7, 1958 |

FOREIGN PATENTS

| | | |
|---|---|---|
| 40,911 | Denmark | Oct. 14, 1929 |
| 273,291 | Germany | July 28, 1912 |